United States Patent [19]
Bunning

[11] 3,941,290
[45] Mar. 2, 1976

[54] FLEXIBLE CHART FEEDING GUIDE OR CHUTE

[75] Inventor: John G. Bunning, Indianapolis, Ind.

[73] Assignee: Esterline Corporation, New York, N.Y.

[22] Filed: Aug. 26, 1974

[21] Appl. No.: 500,753

[52] U.S. Cl. .......................... 226/83; 226/89; 226/91
[51] Int. Cl.² .................................................. B65H 23/04
[58] Field of Search ........... 226/82, 83, 89, 91, 196, 226/199; 346/136; 242/76

[56] References Cited
UNITED STATES PATENTS

| | | | |
|---|---|---|---|
| 2,551,707 | 5/1951 | Schnee | 226/82 X |
| 2,622,476 | 12/1952 | Ress | 226/83 X |
| 2,890,619 | 6/1959 | Waller | 226/196 UX |
| 3,265,320 | 8/1966 | Johnson | 226/91 X |

Primary Examiner—Richard A. Schacher
Attorney, Agent, or Firm—Woodard, Weikart, Emhardt & Naughton

[57] ABSTRACT

A chart recorder has a drawer containing a supply of chart paper fed to the chart marking area, and an accumulation of marked chart paper received from the chart marking area. A flexible curved guide is connected to the drawer and to a permanent fixed guide and assumes different configurations when the drawer is moved from the chart accumulating position during a recording mode of operation, to a chart loading position when the drawer is moved to position for removing an accumulation of marked chart paper and installing and threading a new supply of chart paper during the chart threading mode. The configuration of the flexible guide aids in threading paper onto a drive roll during the threading mode, and aids in guiding the paper around obstructions and onto the roll during the recording mode.

17 Claims, 5 Drawing Figures

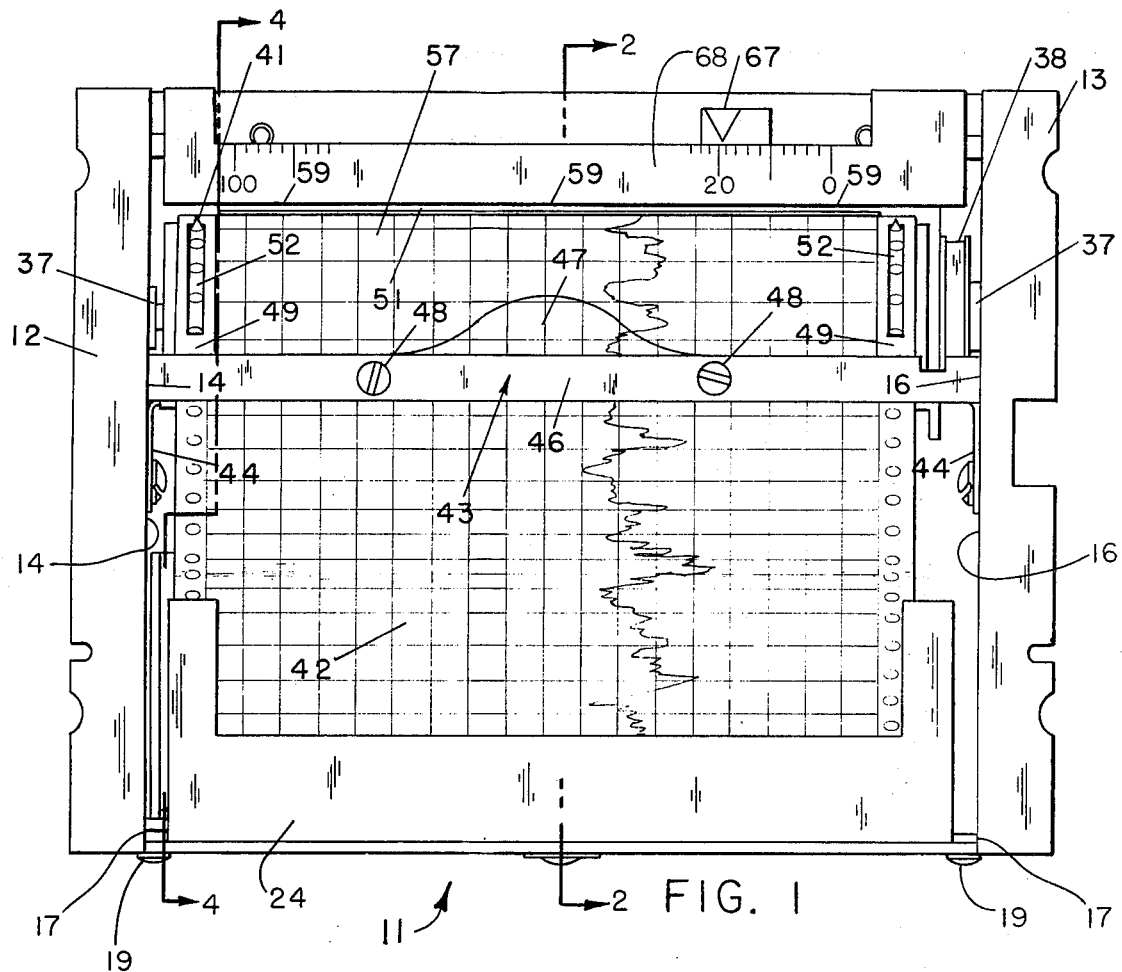
FIG. 1
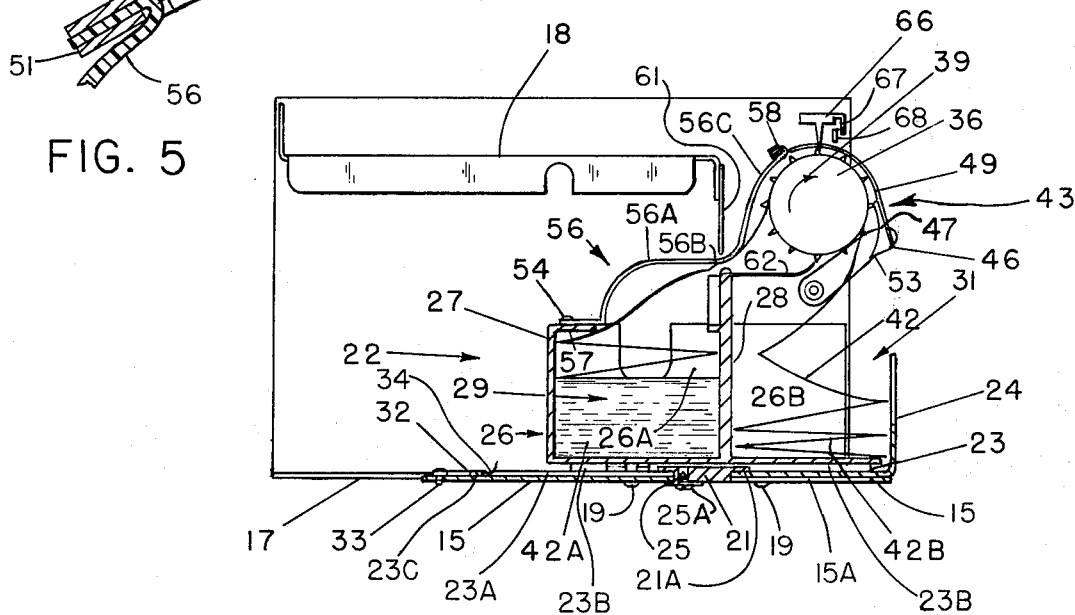
FIG. 5
FIG. 2

FLEXIBLE CHART FEEDING GUIDE OR CHUTE

BACKGROUND OF THE INVENTION

1. Field of the Invention

This invention relates generally to chart recorders, and more particularly to means facilitating the feeding of chart paper onto a drive roll.

2. Description of the Prior Art

Various ways and means have been devised to assist in guiding or threading or feeding record media onto rolls, spools, reels, or the like. Some patents dealing with this general subject matter, and which are by no means representative of all of the art which might exist in this area, are as follows:

| | | |
|---|---|---|
| 2,551,707 | Schnee | May 8, 1951 |
| 2,879,993 | Scozzafava et al | March 31, 1959 |
| 3,107,836 | Van't Veld | Oct. 22, 1963 |
| 3,611,431 | Rosmanith | Oct. 5, 1971 |
| 3,713,170 | Kaufman | Jan. 23, 1973 |

There are instances in which it is desirable to employ a strip chart recorder as one component of a large instrument panel. It is desirable that such recorder occupy as little vertical space as possible and that it not project significantly from the front of the overall panel. A way of accomplishing this is to provide a slide-out drawer having a chart supply box, and a chart accumulating box immediately in front of the supply box. Chart paper in the fan-folded (Z-fold) configuration is stored in the supply box and fed upward therefrom, over a chart drive roll, and downward therefrom into the accumulator box. This is fine from the standpoint of minimizing the overall height, and facilitating a comparatively flush front panel configuration, but it necessitates a comparatively great fore and aft depth of the drawer. Therefore, if the drawer is pulled out far enough for convenient insertion of a new supply of chart paper in the supply box, it is very difficult to successfully manipulate the chart so as to feed it from the supply box back into the recorder and up around the chart drive roll. If the drawer is pushed inward for greater proximity of the supply box to the drive roll, there is too little vertical space between the drive roll and the top of the drawer to enable convenient insertion of the fingers into position to facilitate guiding the paper up around the drive roll. While means can be devised to facilitate the threading of paper onto a sprocketed drive roll in the chart threading mode, such means must be properly located in the recording mode so as to not interfere with proper paper feeding. It seems that heretofore the means which were devised for convenience in chart threading, would tend to interfere with performance in the recording mode. In working with this problem, I have reached the conclusion that any permanently affixed, inflexible hardware does not lend itself to optimum chart threading/feeding, since it interferes in one mode or the other. To overcome this disadvantage, I have devised a flexible membrane type of guide or chute capable of optimum performance in both modes. The present invention solves the problem and facilitates the loading of either the Z-fold or roll stored chart onto the drive roll.

SUMMARY OF THE INVENTION

Described briefly, in a typical embodiment of the present invention, a flexible sheet is mounted at one end adjacent a chart drive roll, and extends therefrom to a connection with the chart supply means of a recorder. The sheet is flexible so as to adopt a configuration aiding the threading of chart media onto the drive roll when the supply means is in the chart loading condition. Yet the sheet is flexible to readily adopt a different configuration when the chart supply means is moved to another position in which it is disposed during the recording mode of operation of the recorder and, in that second configuration, continues to aid in the feeding of the chart paper onto the roll.

BRIEF DESCRIPTION OF THE DRAWINGS

FIG. 1 is a front view of a basic chart recorder employing the present invention therein.

FIG. 2 is a section taken at line 2—2 in FIG. 1 and viewed in the direction of the arrows but showing only features pertinent to the present invention employed in a model using Z-fold chart paper and in the recording mode.

FIG. 5 is an enlarged section through the connection of the flexible guide to the fixed guide.

DESCRIPTION OF THE PREFERRED EMBODIMENT

Figure 3:
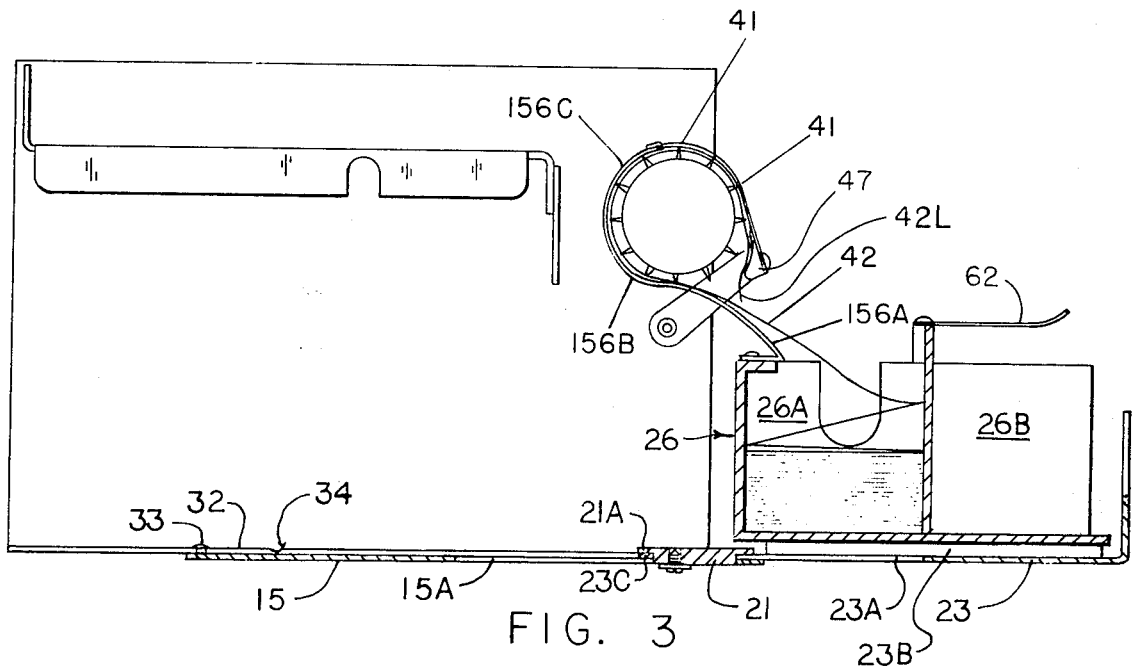
FIG. 3 is a simplified view similar to FIG. 2 but showing the supply-accumulator drawer pulled out for loading the unit with new chart paper, this being the chart threading mode.

Referring now to the drawings in detail, the chart recorder 11 includes a chassis having front side flanges 12 and 13 turned outwardly from the walls 14 and 16, thereof, respectively, inwardly turned side flanges 17 at the bottom of each of these walls, and a platform 18 extending between the walls. A drawer base plate 15 is affixed to the chassis by screws 19 secured in the flanges 17, and has a closed ended slot 15A extending longitudinally in the front portion thereof and receiving therein a drawer slide stop block 21, movable from the position shown in FIG. 2 out to the position shown in FIG. 3.

The drawer 22 includes a drawer slider base 23 having an upwardly turned front wall 24 and a longitudinally extending closed ended slot 23A, also receiving the block 21 therein. The combination of the upper perimetrical flange 21A on the block, and the washer 25 on the bottom of the block and retained by screw 25A threadedly received in the bottom of the block, serves to retain the block in the slots 15A of the base plate 15 and 23A of the slider base 23.

Base 23 has a pair of bosses or ribs 23B parallel to and on opposite sides of slot 23A. Drawer box 26 is mounted on top of these bosses and fastened to them by screws (not shown). The drawer box 26 has side walls, one of which is shown at 26A, 26B in FIG. 2, portion 26A being between the rear wall 27 and intermediate wall 28, and the portion 26B being ahead of the intermediate wall. The supply portion or compartment 29 of the drawer is between the rear wall and intermediate wall, and the accumulator portion or compartment 31 of the drawer is between the intermediate wall and the front wall 24. A drawer detent spring 32 is fastened by a screw 33 to the drawer base plate 15 and has a detent button 34 therein received in slot 23A in the drawer slider base 23, just ahead of the portion 23C of base 23 closing the rear end of slot 23A, to retain the drawer closed in the position shown in FIG. 2.

A chart drive roll 36 is mounted in bearings 37 supported in the walls 14 and 16, and is driven by a drive belt 38 (FIG. 1) driven by a drive motor (not shown) to drive the roll in the direction of the arrow 39 (FIG. 2). At each end of the roll is a set of drive roll pins or sprocket teeth 41 receivable in apertures at each edge of the chart paper 42 to drive the paper from the supply portion of the box or drawer to the accumulator portion. A chart hold-down and folding wedge assembly 43 has a pair of side mounting bracket arms 44 affixed to the walls 14 and 16 of the chassis, so that this assembly is fairly rigid. A front cross member 46 extends between these arms and serves as a support for the chart folding wedge 47 which is attached thereto by a pair of screws 48. Curved chart hold-down guides 49 extend upwardly and to the rear from the cross member 46, and have an upper cross member 51 extending horizontally between the upper rear ends. Each of these guides 49 has a semicylindrical portion with its center at about the axis of rotation of the drive roll, and is slotted as at 52 to receive therethrough the drive roll pins. Accordingly, with this arrangement, the chart paper is driven from the Z-folded supply stack 42A around the top of the chart drive roll sprockets, and between them and the chart hold-down guides 49, and downwardly therefrom into the chart accumulator portion 31 of the drawer to accumulate in a Z-fold stack at 42B. The lower margin of the folding wedge at 53 is directed rearwardly so as to encourage the chart descending from the drive roll to move in a generally rearward direction, thus encouraging the return to a Z-folded stack configuration.

According to a typical embodiment of the present invention, a rectangular sheet of flexible smooth material is fastened to the chart supply box and to the chart hold-down assembly. The rear portion of this sheet is fastened to the top of the rear wall of the supply portion of the drawer by a pair of screws 54 passing through the sheet 56 and secured in the top flange 57 of the rear wall 27 of the drawer. The front edge of sheet 56 is passed up through the opening 57 between the lower and upper cross members 46 and 51 of the hold-down assembly and back around the front edge of the upper cross member 51 thereof and is fastened down on top of the rear upper cross member 51 by means of a clamping plate 58 which is riveted to the upper cross member 51 at three points 59. The width of the flexible sheet is preferably the same as the overall width of the chart paper. A suitable material for the sheet is "Mylar" in a thickness of 0.005 inches. As is shown in FIG. 2, with the drawer in the closed position for the recording mode, this curved sheet has assumed a nicely curved configuration upwardly and forwardly at 56A under the stationary downwardly projecting cross member 61 of the recorder, and then upwardly in a nice S-shaped curve 56B–56C to a point of tangency of the curve thereof with the curve of the downwardly and forwardly curved side guides 49 of the rigid hold-down assembly at the upper rear cross member 51. Therefore it aids in the passage of the Z-fold chart paper from the supply compartment of the box or drawer, forwardly and upwardly around the drive roll.

When the drawer is pulled out to the position shown in FIG. 3 for loading the recorder, the flexible guide sheet 56 has assumed a new curved configuration upward and to the rear at 156A and then more steeply upward at 156B and forward at 156C, again into the attitude of tangency to the curve of the side guides of the hold-down, and thereby brings the leading edge 42L of the chart paper 42 into a position tangent the drive roll and hold-down as it is fed to the rear by the fingers from the supply portion of the drawer, with the drawer open in the loading position as shown in FIG. 3. When the leading edge has been started onto the roll, the roll can be turned whereby the chart driver teeth thereof can pull the paper around it until the leading edge can be seen projecting below the wedge 47 (as shown in FIG. 3), to verify satisfactory threading. Then the drawer can be pushed in until the detent button 34 snaps into slot 23A to retain the drawer in the operating position of FIG. 2.

Figure 4:
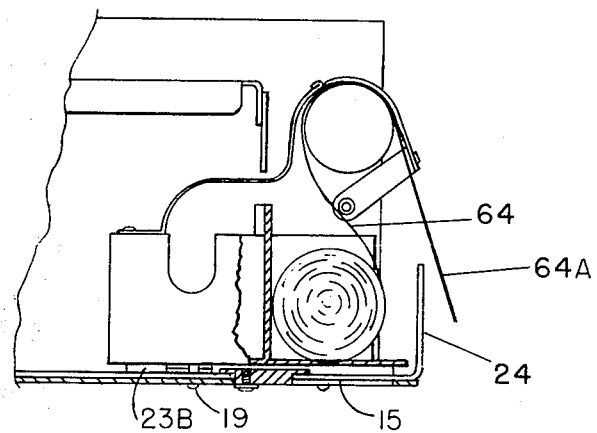
FIG. 4 is a fragmentary view similar to FIG. 2 but taken at line 4—4 and showing the unit employed with a chart supply roll (instead of Z-fold) in the recording mode.

When the chart is supplied in roll form, it can be used in the front portion of the drawer as shown in FIG. 4. When this is done, the stripper fingers 62, which aid in the separation of Z-folded chart from the drive roll as it comes off the front of the drive roll, are removed. Also, the folding wedge 47 is removed. This enables free passage of the roll chart 64 up from the roll in the front portion of the box or drawer, around the drive roll and then down out the front past the front wall 24 of the box or drawer as shown at 64A. In this instance too, the smooth curvature of the threading chute 56, when the drawer is pulled out for the loading position, aids in feeding the chart up to the position of tangency with the chart drive roll sprockets and hold-down guides at the upper rear cross member 51 of the chart hold-down assembly. The chart guide apparatus, and loading and unloading do not interfere with the stylus 66, and associated indicator pointer 67 and scale 68 which are above the chart drive roll. However, of course, the stylus does extend into the opening 57 in the chart hold-down assembly for marking the chart as it is driven around the roll, the marking being in accordance with the horizontal position of the stylus in response to the input signal being applied to the recorder.

From the foregoing description, it can be seen that the present invention solves a very difficult problem and is useful regardless of whether the roll-type of chart or the Z-folded type of chart is being used.

The invention claimed is:

1. A flexible chart feeding guide or chute comprising:
   first and second supports at different elevations;
   a chart storage member;
   a sheet spanning a space between said first and second supports and supported by said first and said second supports;
   said first support being connected to said sheet in at least two horizontally spaced points;
   said second support being connected to said sheet in at least two horizontally spaced points;
   said first support being above said second support;
   said sheet being flexible about a line between the two spaced points of the upper support;
   said first and second supports being horizontally movable with respect to each other in a direction perpendicular to the direction of said line between the two points of said first support, one of said supports being connected to said storage member and movable therewith with respect to the other of said supports when said storage member is moved from a chart loading position with respect to said supports to a chart use position, and back from said use position to said loading position.

2. The guide of claim 1 wherein:
said second support is movable from a position below and behind said first support to a position below and in front of said first support.

3. The guide of claim 1 wherein:
said second support is a chart supply and accumulator means.

4. A flexible chart feeding guide or chute comprising:
first and second supports at different elevations;
a sheet spanning a space between said first and second supports and supported by said first and said second supports;
said first support being connected to said sheet in at least two horizontally spaced points;
said second support being connected to said sheet in at least two horizontally spaced points;
said first support being above said second support;
said sheet being flexible about a line between the two spaced points of the upper support;
said first and second supports being horizontally movable with respect to each other in a direction perpendicular to the direction of said line between the two points of said first support,
said second support being a chart supply and accumulator means,
said supply and accumulator means including a box having a supply compartment and an accumulator compartment with said sheet fastened to the upper rear margin of said supply compartment.

5. The guide of claim 4 wherein:
said sheet is plastic about 0.005 inches thick.

6. The guide of claim 4 wherein:
said first support is a rigid upper guide normally above said accumulator compartment and tangent said sheet and blending with said sheet to form a smooth guide curve.

7. The guide of claim 6 wherein:
said box is movable to a position wherein said accumulator compartment is below and in front of said first support.

8. The guide of claim 7 wherein:
said sheet cooperates with said rigid guide in both positions of said box to provide a smooth curve into said rigid guide.

9. In a recorder having chart supply means and chart ive means, and wherein said chart supply means is ovable from a position below and behind said drive means to a position below and in front of said drive means, the improvement comprising:
a flexible guide means movable from one configuration when said supply means is behind said drive means to another configuration when said supply means is in front of said drive means to facilitate introduction of chart material from said supply means into said drive means from in front of said drive means.

10. The improvement of claim 9 wherein:
said drive means is a chart drive roll.

11. The improvement of claim 10 and further comprising:
rigid guide means partially encircling said drive roll,
said flexible guide means being disposed with a portion of its surface tangent a portion of the surface of said rigid guide means.

12. The improvement of claim 11 wherein:
said rigid guide means include a semi-cylindrical guide member having a center of curvature at the axis of rotation of said drive roll
said flexible guide being a sheet of flexible material attached to said rigid guide adjacent a point at which a point on said drive roll is moving away from said sheet and toward said rigid guide member.

13. The improvement of claim 12 and further comprising:
chart material extending from said supply means around said chart drive roll,
said flexible guide sheet cooperating with said rigid guide to guide said chart material from said supply means onto said roll.

14. The improvement of claim 13 wherein:
the one configuration of said guide sheet is upward from said supply means and curving forward and then upward again and then curving forward to the point of attachment to said rigid guide, when said supply means is behind said drive roll.

15. The improvement of claim 13 wherein:
said another configuration of said guide sheet is slightly upward and substantially to the rear from said supply means and then curving upward to the point of attachment to the rigid guide, when said supply means is in front of said drive means.

16. The improvement of claim 15 wherein:
said another configuration includes a forward curve tangent to the curve of the rigid guide at the point of attachment.

17. The improvement of claim 16 wherein:
the upward and forward curves and the curve of said rigid guide cooperate to form a continuous smooth surface of revolution about the center of revolution of said drive roll.

* * * * *